United States Patent [19]

Shroyer et al.

[11] 4,220,412
[45] Sep. 2, 1980

[54] ILLUMINANT DISCRIMINATION APPARATUS AND METHOD

[75] Inventors: Richard A. Shroyer, Rochester; William A. Martin, Fairport, both of N.Y.

[73] Assignee: Eastman Kodak Company, Rochester, N.Y.

[21] Appl. No.: 954,690

[22] Filed: Oct. 25, 1978

[51] Int. Cl.² .................. G01J 3/34; G01J 1/42; G03B 7/00
[52] U.S. Cl. .................. 356/218; 356/226; 354/60 L; 250/226
[58] Field of Search .................. 356/218, 226, 404; 354/31, 60 L; 250/226

[56] References Cited

U.S. PATENT DOCUMENTS

| | | | |
|---|---|---|---|
| 3,672,268 | 6/1972 | Scheibel et al. | 354/31 |
| 3,904,872 | 9/1975 | Ebukuo et al. | 250/226 |
| 4,041,308 | 8/1977 | Fujita | 354/31 |
| 4,079,388 | 3/1978 | Takahama et al. | 354/31 |

*Primary Examiner*—Rolf G. Hille
*Attorney, Agent, or Firm*—Warren W. Kurz

[57] ABSTRACT

A method and apparatus for discriminating among various types of illuminants, such as fluorescent light, incandescent light and natural daylight. Such apparatus includes a photoelectric circuit for producing a signal having an amplitude which varies with intensity variations of the illuminant, a bandpass filter circuit having a bandpass centered at the fundamental frequency of the intensity variations of an illuminant energized by an alternating current source, a high-pass filter circuit that passes frequencies higher than such fundamental frequency, a pair of peak detectors for detecting the peak value of signals passed by the first and second filter circuits, and logic circuitry responsive to the outputs of the peak detectors for providing logic outputs indicative of the type of illuminant.

10 Claims, 3 Drawing Figures

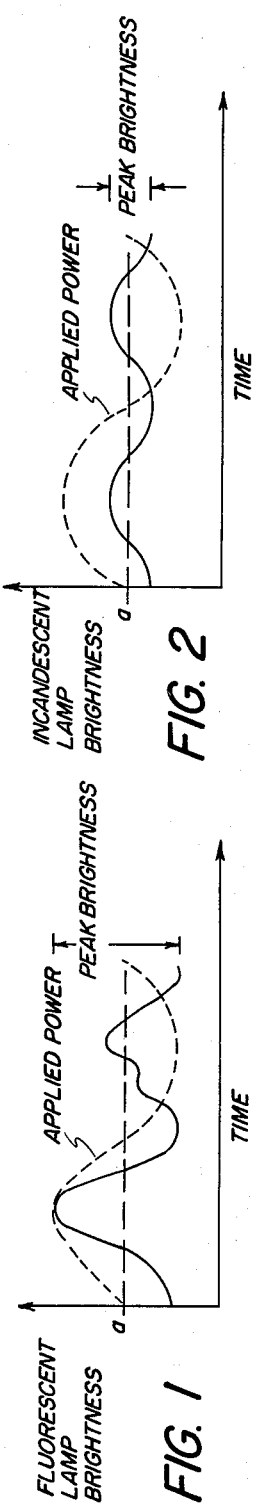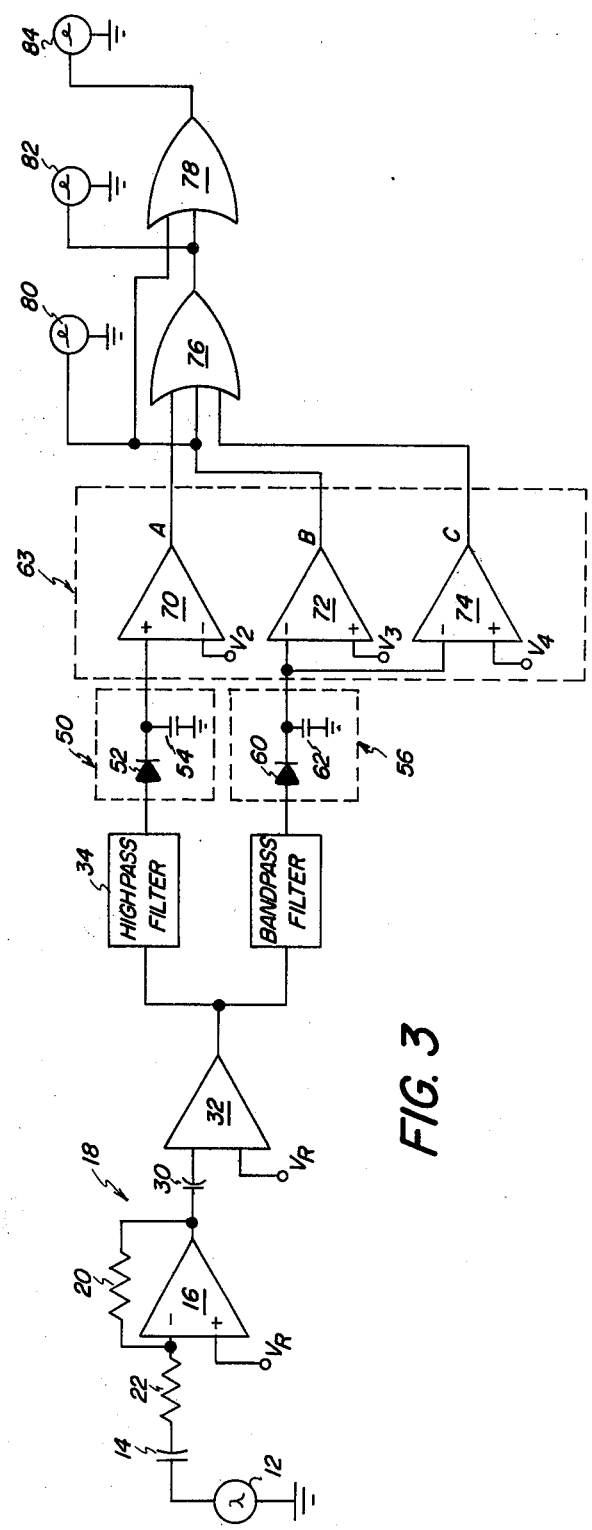

ILLUMINANT DISCRIMINATION APPARATUS AND METHOD

BACKGROUND OF THE INVENTION

The present invention relates to improvements in devices and methods for discriminating among various types of illuminants, such as fluorescent light, incandescent light and natural daylight.

To produce faithful photographic reproductions of multicolored scenes, the color balance of the photographic film must be compatible with the spectral characteristics of the scene illuminant. Many photographic color emulsions are color balanced for use with natural daylight; others are color balanced for use with incandescent (i.e. tungsten) illumination. To properly expose a color film with an illuminant for which the film is not color balanced, it is necessary to use color compensating filters.

In the commonly assigned, copending U.S. application Ser. No. 729,624, now abandoned, filed in the name of Lee F. Frank on Oct. 5, 1976, apparatus is disclosed for detecting the type of illuminant which is illuminating a scene of photographic interest. Such apparatus discriminates among fluorescent light, incandescent light and steady-state light (e.g. natural daylight or artificial light emanating from a DC source) by detecting the so-called "flicker ratio" of the light (i.e. the ratio of the brightest to the dimmest intensities of the light during a given time interval). Natural daylight, like other light emanating from a source of constant brightness, has a flicker ratio of unity. Artificial light sources, being energized by ordinary household line voltage, has a brightness which flickers at approximately 120 hertz, twice the frequency of the line voltage. Owing to the different rates at which the energy-responsive elements of incandescent and fluoroescent lamps respond to applied energy such illuminants can be readily distinguished by their respective flicker ratio. The flicker ratio of fluorescent light has been found to be approximately 10 times that of incandescent light. The output of the Frank flicker ratio-detecting apparatus is used to control the position of color correction filters in a camera or, alternatively, to encode the film with the type of illuminant for use in controlling a subsequent printing process.

In utilizing the apparatus described above, one finds that it is quite effective in discriminating among the three types of illuminants mentioned, especially when the illuminant constitutes pure incandescent light, or pure fluorescent light, or pure daylight. However, when the illuminant comprises a certain mixture of daylight and fluorescent light, the Frank apparatus is unable to distinguish this mixture from pure incandescent light. One finds that as the DC component (i.e. the daylight component) of the mixture increases with respect to the AC component (i.e. fluorescent light component), the flicker ratio of the mixture decreases. When the DC component has the effect of reducing the flicker ratio by an order of magnitude, the flicker ratio of the mixture is indistinguishable from that of incandescent light.

SUMMARY OF THE INVENTION

In accordance with the present invention, there is provided improved apparatus which is capable of detecting which of a plurality of different illuminants, e.g. incandesent light, fluorescent light and natural daylight, is illuminating a region of interest, and in the event the illuminant comprises a mixture of individual illuminants, which of the individual illuminants is predominant. It has been found that incandescent light can be readily distinguished from fluorescent light, regardless of the existence of any daylight component, by their respective temporal signatures. When energized by a sinusoidal waveform, such as that which characterizes conventional household AC current, the respective brightness of incandescent and fluorescent sources vary according to a waveform which is a harmonically distorted sinusoid. It has been found that the harmonic distortion of the waveform which characterizes the instantaneous brightness of a fluorescent lamp is approximately 3.5 times the distortion which characterizes the same waveform of an incandescent lamp. According to the invention, this information is used to discriminate fluorescent lighting from incandescent and daylight lighting. The illuminant discrimination apparatus of the invention comprises a photoelectric circuit which produces an electrical signal having an amplitude which varies with the instantaneous intensity of an illuminant, means for detecting the amount of harmonic distortion in such signal, and means for indicating, based upon the output of the harmonic distortion detecting means, the type of illumination received by the photoelectric circuit. According to a preferred embodiment, this apparatus is combined with flicker ratio detecting circuitry to provide an apparatus which is capable of discriminating among fluoroescent light, incandescent light and natural daylight.

The method of the invention comprises the step of sensing the amount of harmonic distortion in a signal which varies in response to intensity variations of an AC energized artificial source.

The invention and its objects and advantages will become more apparent in the detailed description of the preferred embodiment presented below.

BRIEF DESCRIPTION OF THE DRAWINGS

In the Detailed Description of the Preferred Embodiment of the invention presented below, reference is made to the accompanying drawings wherein:

FIG. 1 illustrates the typical brightness fluctuation of a fluorescent light source during one cycle of applied power;

FIG. 2 shows the typical brightness fluctuation of a tungsten light source during one cycle of applied power; and FIG. 3 is a schematic diagram of a circuit embodying the present invention.

DETAILED DESCRIPTION OF A PREFERRED EMBODIMENT

Referring now to the drawings, FIGS. 1 and 2 present waveforms which respectively illustrate the manner in which the brightness of fluorescent and incandescent light sources varies with time as a result of being energized by a sinusoidally varying voltage, e.g. the AC voltage characteristic of conventional household power. It will be noted that during both the positive and negative half-cycles of the applied power, the source intensity increases; thus, the fundamental frequency in which the source brightness varies is twice the frequency of the applied power. For conventional 60 hertz power, the fundamental frequency at which the brightness of AC energized artificial light sources will vary is 120 hertz.

In comparing the waveforms of FIGS. 1 and 2, it will be apparent that the peak brightness (i.e. the maximum brightness variation occurring during one cycle of applied power) of the fluorescent source is substantially greater than that of the incandescent source. Thus, pure flourescent light can be readily distinguished from pure incandescent light by merely determining the peak brigntness of the source. As mentioned above, apparatus for distinguishing fluorescent light from incandescent light by determining the "flicker ratio" (which is directly proportional to the peak brightness) of a light source is disclosed in the aforementioned Frank application. However, as mentioned above, the Frank apparatus is not capable of distinguishing from incandescent light, fluorescent light which is mixed with a certain amount of light from a steady-state source, such as natural daylight.

In further comparing the waveforms of FIGS. 1 and 2, it will be noted that the brightness curve of the incandescent source is more sinusoidal in shape than that of the fluorescent source; stated otherwise, the brightness curve of the fluorescent source contain more harmonic distortion (i.e. distortion due to the presence of harmonic frequency components other than the fundamental) than does the incandescent source. In determining the percent of harmonic distortion of the waveforms which characterize the respective time-varying brightness curves of incandescent and fluorescent sources, one finds that there is approximately 10% harmonic distortion in the brightness curve of incandescent light, whereas there is approximately 35% harmonic distortion in the brightness curve which characterizes the fluorescent source. The percent of harmonic distortion is numerically defined as 100 times the ratio of the square root of the sum of the squares of the root-mean-square voltages of each of the individual harmonic frequencies, to the root-mean-square voltage of the fundamental. It is this difference in harmonic distortion between the two brightness curves which is used by the apparatus and method of the present invention to distinguish incandescent light from fluorescent light, even fluorescent light which is mixed with varying amounts of natural daylight or with any other steady-state source so as to have a peak brightness characteristic identical to that of pure incandescent light. Using this same information, it is also possible to detect which light source is predominant in a mixture of fluorescent and incandescent light.

In FIG. 3, there is shown a circuit according to a preferred embodiment of our invention which includes a photosensor 12, preferably a photovoltaic cell, that responds to incident light by producing a voltage that is logarithmically related to the intensity of light impinging thereon. The light falling onto the photosensor 12 may be from a steady-state source (e.g. natural daylight), an artificial source whose brightness fluctuates as a function of time, or a combination of such sources. When the light is from an artificial source, such as a fluorescent or incandescent lamp driven by a line voltage operating at a predetermined frequency, photosensor 12 produces a voltage having a DC component (or average value) proportional to the average light intensity a, and an AC component having a fundamental frequency that is proportional to twice the frequency of the line voltage. Assuming that an artificial light source is operating at the conventional household line frequency of 60 Hz, the fundamental frequency at which the output signal from photosensor 12 will vary will be 120 Hz.

Assuming that the maximum intensity of light impinging upon the photosensor 12 during one cycle of applied power produces a voltage $V_b$, and that the minimum intensity of light produces a voltage $V_d$, the amplitude of the AC component of the voltage produced by photosensor 12, and seen by an AC coupling capacitor 14, would be proportional to log $V_b$ minus log $V_d$, or log $(V_b/V_d)$. Thus, the amplitude of the AC component of the signal produced by the photosensor is proportional to the log of the "flicker ratio" $(V_b/V_d)$.

Capacitor 14 blocks the DC component of the voltage produced by the photosensor and passes only the AC component to an amplifier, such as, operational amplifier 16. The AC signal is coupled to one input terminal of the amplifier 16 while the other input terminal receives a bias voltage $V_1$ from a reference voltage sensor. Amplifier 16 includes a resistive feedback loop 18. The voltage gain K of amplifier 16, as is well known, is given by:

$$K = R_1/Z \tag{1}$$

where $R_1$ is the value of resistor 20 and Z is the impedance of capacitor 14 and a resistor 22. The output of the amplifier 16 is coupled through a capacitor 30 and a gain stage (amplifier) 32, into the parallel combination of a high-pass filter 34 and a bandpass filter 36. The high-pass filter 34 passes all frequencies above the fundamental frequency of the artificial illumination (i.e. 120 Hz). The signal thus passed is proportional to the harmonic distortion present in the output of light-sensitive element 12. The bandpass filter 36 passes only a narrow band of the signals centered at the fundamental frequency (e.g. 120 Hz) of artificial illumination.

The output of filter 34 is coupled to a peak detector 50 which comprises a diode 52 and a capacitor 54, and the output of filter 36 is coupled to a peak detector 56, comprising a diode 60 and capacitor 62.

The peak-detectors 56 and 50 produce outputs that respectively represent the log of the flicker ratio at the fundamental 120 Hz frequency and the amount of harmonic distortion present in the fundamental frequency. Because the log of the flicker ratio of light from a fluorescent lamp is approximately ten times as high as the log of the flicker ratio of light from a tungsten lamp, the output from the peak detector 56 will vary between well-defined voltage values when the light-sensitive element 12 is exposed to fluorescent or tungsten light respectively. However, when the light falling on photosensor 12 consists of a combination of fluorescent light and daylight, the voltage output from peak detector 56 will approach that produced by incandescent light. Because the harmonic distortion present in the AC signal produced by fluorescent light is approximately three and one-half (3.5) times the distortion present in the signal caused by incandescent light, the output of the peak detector 50 will also assume distinct values characteristic of fluorescent and incandescent illumination.

The outputs from the peak detectors 50, 56 are fed to an analog comparator 63, which comprises threshold logic gates 70, 72 and 74 which produce outputs A, B and C, respectively. The threshold levels of gates 70, 72 and 74 are set by three reference voltage sources, $V_2$, $V_3$ and $V_4$, respectively. The threshold level of gate 70 is set so that a positive output (logical "1") is produced on line A when the output from peak detector 50 exceeds the threshold established by reference voltage $V_2$. Reference voltage $V_2$ is selected to be of a value between the voltage levels indicative of incandescent and fluorescent light; i.e. greater than the incandescent voltage level and greater than the fluorescent voltage level. The predominance of either incandescent or fluorescent light in a mixture of the two can be determined by setting the level of reference voltage $V_2$ midway between the voltage levels produced by peak detector 50 in the presence of pure incandescent and pure fluorescent light.

The threshold level of gate 74 is set so that a positive output (logical "1") is produced on line C when the output from peak detector 56 reaches a level that is indicative of the high flicker ratio present in fluorescent light. Until this condition is met, the output of gate 74 is logical zero. Gate 72 is connected in such a manner that it produces a logical "1" output on line B until the output of peak detector 56 (i.e. the input to gate 74) exceeds the reference voltage $V_3$. Reference voltage $V_3$ is set so that the positive output is terminated when the output from peak detector 56 reaches a level that is indicative of the flicker ratio present in tungsten or fluorescent light, or in fluorescent light combined with daylight.

To utilize the outputs A, B and C to generate an indication of the type of lighting present, the outputs A, B and C are combined in a first NOR gate 76 whose output, together with the output of gate threshold 72 is coupled to the input of a second NOR gate 78. The output of threshold 72 is coupled to the input of a second NOR gate 78. The output of threshold gate 72 is coupled to an indicator lamp 80 or the like. Outputs of NOR gates 76, 78 are respectively coupled to indicator lamps 82, 84. As explained below, lamps 80, 82 and 84 are selectively energized to indicate the type of illuminant incident upon the photosensor. Rather than being used to energize indicator lamps, the outputs of NOR gates and gate 72 could be used for other purposes, such as to control the positioning of corrective filters in photographic cameras and printers.

The outputs A, B and C assume positive (1) or zero (0) states when the following types of light are incident upon photosensor 12.

| Type of Light | Output States | | |
|---|---|---|---|
| | A | B | C |
| Fluorescent | 1 | 0 | 1 |
| Fluorescent & Daylight | 1 | 0 | 0 |
| Tungsten | 0 | 0 | 0 |
| Daylight | 0 | 1 | 0 |

Since the output of threshold gate 72 is coupled to lamp 80, lamp 80 will be energized, to indicate daylight, whenever the flicker ratio of the light incident on element 12 is less than that required to change the output of gate 72, from logical "1" to "0". Similarly, lamp 82 will be energized to indicate the presence of incandescent light whenever the flicker ratio of the light shining on photosensor 12 is higher than that required to shut off the output of gate 72, less than that required to produce a logical "1" output from gate 74, and there is insufficient harmonic distortion in the incoming signal to produce a logical "1" output from gate 70. Lamp 84 will be energized to indicate that fluorescent light is shining on photosensor 12 whenever the output of gate 70 is logical "1", indicating a high amount of harmonic distortion, and the flicker ratio is high enough to change the output of gate 72 from logical "1" to "0". These conditions are met when the light incident on light-sensitive element 12 is either (1) pure fluorescent light or (2) a mixture of fluorescent light and daylight, the proportion of fluorescent light exceeding a certain value determined by the reference voltage applied to gate 70.

The invention has been described in detail with particular reference to a preferred embodiment thereof, but it will be understood that variations and modifications can be effected within the spirit and scope of the invention.

We claim:

1. Illuminant discrimination apparatus for discriminating incandescent light from a mixture of daylight and fluorescent light, such incandescent and fluorescent light varying in intensity at a fundamental frequency, said apparatus comprising:
   (a) light-sensitive means responsive to incident light for producing a first signal proportional to the instantaneous intensity of said incident light;
   (b) circuit means for producing a second signal proportional to the amount of harmonic distortion in said first signal; and
   (c) means responsive to said second signal for producing a signal indicative of the type of light incident on said light-sensitive means.

2. The apparatus as defined in claim 1 wherein said circuit means comprises a filter circuit for filtering said fundamental frequency out of said first signal, and a peak detector circuit for detecting the peak value of the filter circuit output.

3. Illuminant discrimination apparatus for detecting which of three types of light, incandescent light, fluorescent light and daylight, is predominant in an illuminated space, such incandescent and fluorescent light being emitted by sources which are periodically energized at a fundamental frequency, said apparatus comprising:
   (a) light-sensitive means responsive to incident light for producing a first signal representative of intensity variations in said incident light;
   (b) first circuit means, coupled with said light-sensitive means and responsive to said first signal, for producing a second signal representative of the amplitude of said intensity variations occurring at sid fundamental frequency;
   (c) second circuit means, coupled with said light-sensitive means and responsive to said first signal, for producing a third signal representative of the amplitude of said intensity variations occurring at frequencies above said fundamental frequency;
   (d) logic means, coupled with said first and second circuit means and responsive to said second and third signals, for providing logic outputs indicative of the type of light incident upon said light-sensitive means; and
   (e) means, coupled with said logic means and responsive to said logic outputs, for producing a signal indicative of the type of light incident upon said light-sensitive means.

4. The apparatus as defined in claim 3 wherein said light-sensitive means comprises a photovoltaic cell.

5. The apparatus as defined in claim 3 wherein said first circuit means comprises a bandpass filter having a bandpass centered at approximately said fundamental frequency, and a peak detection circuit for providing a signal representative of the peak value of electrical signals passed by said bandpass filter.

6. The apparatus as defined in claim 3 wherein said second circuit means comprises a high-pass filter for filtering out of said first electrical signal frequency components substantially equal to and less than said fundamental frequency, and a peak detection circuit for producing a signal representative of the peak value of signals passed by said high-pass filter.

7. The apparatus as defined in claim 3 wherein said logic means comprises the first threshold sensing means for producing a fourth signal in the event said second signal exceeds a predetermined threshold value, second threshold sensing means for producing a fifth signal in the event said second signal is less than a predetermined threshold value, and a third threshold sensing means for producing a sixth signal in the event the amplitude of said second signal exceeds a predetermined threshold value.

8. The apparatus as defined in claim 7 wherein said logic means further comprises a first NOR gate coupled to said first, second and third threshold sensing means and responsive to the simultaneous absence of said fourth, fifth and sixth signals to produce a seventh signal, and a second NOR gate coupled to said first NOR gate and said second threshold sensing means and responsive to the simultaneous presence of said fifth and seventh signals to produce an eighth signal.

9. A method for discriminating between incandescent-type light and a mixture of daylight and fluorescent-type light, such incandescent-type and fluorescent-type light varying in intensity at a fundamental frequency, said method comprising the steps of:
 (a) producing a first signal having an amplitude which varies as a function of light intensity;
 (b) detecting the amount of harmonic distortion in said first signal with respect to said fundamental frequency; and
 (c) producing a second signal indicative of the type of light based on the amount of harmonic distortion detected.

10. A method for discriminating between incandescent-type light and a mixture of daylight and fluorescent-type light, such incandescent-type and fluorescent-type being emitted by sources which are periodically energized at a fundamental frequency, said method comprising the steps of:
 (a) producing a first electrical signal having an amplitude proportional to intensity variations of an unknown illuminant comprising either an incandescent light source of a mixture of fluorescent light and daylight;
 (b) filtering said first signal to pass only those eliminate frequency components which are greater than said fundamental frequency;
 (c) detecting the peak value of said first signal upon being filtered; and
 (d) producing a signal in the event the detected peak value exceeds a predetermined threshold value.

* * * * *